US010414139B2

(12) United States Patent
Lee et al.

(10) Patent No.: US 10,414,139 B2
(45) Date of Patent: Sep. 17, 2019

(54) ADHESIVE COMPOSITIONS AND MULTILAYERED STRUCTURES COMPRISING FUNCTIONALIZED POLYPROPYLENE

(71) Applicant: E. I. DU PONT DE NEMOURS AND COMPANY, Wilmington, DE (US)

(72) Inventors: I-Hwa Lee, Wilmington, DE (US); Qian Deng, Kingston (CA)

(73) Assignee: E. I. DU PONT DE NEMOURS AND COMPANY, Wilmington, DE (US)

( * ) Notice: Subject to any disclaimer, the term of this patent is extended or adjusted under 35 U.S.C. 154(b) by 351 days.

(21) Appl. No.: 15/246,597

(22) Filed: Aug. 25, 2016

(65) Prior Publication Data

US 2017/0058068 A1    Mar. 2, 2017

Related U.S. Application Data

(60) Provisional application No. 62/212,414, filed on Aug. 31, 2015.

(51) Int. Cl.
| | |
|---|---|
| B32B 27/32 | (2006.01) |
| C08L 23/14 | (2006.01) |
| C09J 123/14 | (2006.01) |
| B32B 7/12 | (2006.01) |
| B32B 27/34 | (2006.01) |
| C09J 151/06 | (2006.01) |
| B32B 5/02 | (2006.01) |
| B32B 7/00 | (2019.01) |
| B32B 27/06 | (2006.01) |
| C08L 51/06 | (2006.01) |
| B32B 27/30 | (2006.01) |
| B32B 15/04 | (2006.01) |
| B32B 27/28 | (2006.01) |
| B29C 49/06 | (2006.01) |
| B29K 23/00 | (2006.01) |
| B29K 105/00 | (2006.01) |
| B29K 96/02 | (2006.01) |
| B29C 48/00 | (2019.01) |
| B29C 48/21 | (2019.01) |

(52) U.S. Cl.
CPC .............. *B32B 27/32* (2013.01); *B32B 5/02* (2013.01); *B32B 5/022* (2013.01); *B32B 7/00* (2013.01); *B32B 7/12* (2013.01); *B32B 15/04* (2013.01); *B32B 27/06* (2013.01); *B32B 27/28* (2013.01); *B32B 27/306* (2013.01); *B32B 27/34* (2013.01); *C08L 23/14* (2013.01); *C09J 123/14* (2013.01); *C09J 151/06* (2013.01); *B29C 48/0018* (2019.02); *B29C 48/21* (2019.02); *B29C 49/06* (2013.01); *B29K 2023/086* (2013.01); *B29K 2023/12* (2013.01); *B29K 2096/02* (2013.01); *B29K 2105/0085* (2013.01); *B32B 2307/7242* (2013.01); *B32B 2307/7265* (2013.01); *B32B 2405/00* (2013.01); *C08L 51/06* (2013.01); *C08L 2203/16* (2013.01); *C08L 2205/03* (2013.01); *C08L 2207/02* (2013.01); *C09J 2423/00* (2013.01); *C09J 2431/006* (2013.01); *C09J 2451/00* (2013.01); *C09J 2467/006* (2013.01)

(58) Field of Classification Search
CPC ...... C09J 123/14; C08L 51/06; C08L 2207/02
See application file for complete search history.

(56) References Cited

U.S. PATENT DOCUMENTS

| | | |
|---|---|---|
| 5,106,916 A | 4/1992 | Mitchell |
| 5,367,022 A | 11/1994 | Kiang et al. |
| 5,451,639 A | 9/1995 | Marczinke et al. |
| 5,523,358 A | 6/1996 | Hirose et al. |
| 6,545,091 B1 | 4/2003 | Lee et al. |
| 6,716,928 B2 | 4/2004 | Botros |
| 6,974,556 B2 | 12/2005 | Bemis et al. |

(Continued)

FOREIGN PATENT DOCUMENTS

| | | |
|---|---|---|
| EP | 2305751 A1 | 4/2011 |
| WO | 93/11175 A1 | 6/1993 |

(Continued)

OTHER PUBLICATIONS

PCT International Search Report and Written Opinion for International Application No. PCTUS2016047130 dated Nov. 2, 2016.

(Continued)

*Primary Examiner* — Jeffrey C Mullis

(57) ABSTRACT

Provided are functionalized polypropylene adhesive compositions having a desirable range of melt flow rate. These compositions are obtained by grafting at least one impact polypropylene copolymer or by co-grafting a blend containing at least one impact polypropylene copolymer and at least one random polypropylene copolymer. The polypropylene copolymer(s) are grafted with one or more ethylenically unsaturated carboxylic acids or derivatives of these acids, such as anhydrides. Maleic anhydride is a preferred grafting monomer. Also provided is a multilayer film or sheet structure containing at least one barrier layer and at least one adhesive layer produced from the functionalized polypropylene adhesive composition. The multilayer film or sheet structure may also contain at least one predominantly polypropylene-based layer. In addition, a multilayer film or sheet structure is provided in which a barrier layer or a primer layer is adjacent to at least one layer that is produced from a dry blend or a melt blend of the functionalized polypropylene adhesive composition with a polypropylene matrix polymer.

19 Claims, No Drawings

(56) References Cited

U.S. PATENT DOCUMENTS

| | | |
|---|---|---|
| 7,030,188 B2 | 4/2006 | Botros et al. |
| 7,071,259 B2 | 7/2006 | Botros |
| 7,550,533 B2 | 6/2009 | Lebouef |
| 2017/0058159 A1 | 3/2017 | Lee et al. |

FOREIGN PATENT DOCUMENTS

| | | |
|---|---|---|
| WO | 95/24449 A1 | 9/1995 |
| WO | 2016/025663 A1 | 2/2016 |

OTHER PUBLICATIONS

PCT International Search Report and Written Opinion for International Application No. PCT/US2016/047124 dated Oct. 27, 2016.

ADHESIVE COMPOSITIONS AND MULTILAYERED STRUCTURES COMPRISING FUNCTIONALIZED POLYPROPYLENE

CROSS-REFERENCES TO RELATED APPLICATION

The present application claims priority under 35 U.S.C. § 119 to U.S. Provisional Application No. 62/212,414, filed on Aug. 31, 2015, which is incorporated herein by reference in its entirety.

FIELD OF THE INVENTION

Chemically functionalized polypropylene copolymer compositions are described herein. In particular, the compositions are adhesives. Further provided are multilayer film structures, multilayer sheet structures, and rigid packaging containers containing these adhesives.

BACKGROUND OF THE INVENTION

Several patents and publications are cited in this description in order to more fully describe the state of the art to which this invention pertains. The entire disclosure of each of these patents and publications is incorporated by reference herein.

Packaging films and sheets are increasingly manufactured by coextrusion systems. These systems, in turn, are constantly growing in sophistication. Therefore, it is advantageous to develop polymers that can be manufactured by a variety of coextrusion systems, including blown film, cast film, injection molding, sheet/bottle, and others. Whereas some years ago it was common to have machines capable of coextruding three to five layer structures, today it is routine for machines to coextrude nine or more layers, for example by using an equal number of extruders to feed these layers.

Two common methods for producing these complicated multilayer structures are co-injection molding and injection stretch blow molding. Examples of these methods are described in detail in U.S. Pat. No. 6,974,556 and in European Patent No. EP2305751A1, respectively. These and other new coextrusion systems allow many types of polymers to be used together. Advantageously, these multilayer structures allow for better tailoring of the many properties that may be required in packaging structures, such as low permeability to water, gas or flavoring; toughness; sealability; gloss; transparency; or impact resistance. These tailored structures may also have a lower overall raw material cost, for example if they incorporate smaller amounts of the more expensive components.

Many packaging films and laminates contain layers of polar polymers such as polyamide or a copolymer of ethylene and vinyl alcohol (EVOH) to provide a barrier to the transport of gas and flavor. With the increasing number of extruders in coextrusion blown and cast systems, it is also common for a packaging film or sheet to include some combination of one or more polyamide layer and one or more EVOH layers. Tri-layer combinations used as barrier cores or "barrier sandwiches" comprise a coextrusion of polyamide/EVOH/polyamide layers and are widely employed in packaging films and sheets to improve barrier properties and formability.

In many cases, the exterior side of the coextrusion construction is composed of propylene polymers. The "exterior side" includes the outer layer(s), more particularly the layer(s) that are on the opposite side of the barrier film from the "interior side". The interior side includes one or more inner layers, and in the case of a packaging material the innermost layer contacts the packaging contents. For flexible films, the propylene polymers provide stiffness and moisture barrier properties. They also provide a higher temperature resistance that prevents the film laminate from being deformed when contacted against a sealing bar during heat sealing of such laminates. The temperatures of the seal bars can be very high, particularly for thicker laminates, as heat must be transferred from the seal bar to the internal sealant layer within the short contact times necessary for profitable commercial production. Rigid structures, including coextruded thermoformed sheet, bottles and co-injection molded parts, frequently employ propylene homopolymers and copolymers as the bulking layers for rigidity, physical strength, moisture barrier properties and high temperature resistance that allows the contents of the package to be cooked and retorted.

Polar barrier layers such as those including EVOH are often employed in conjunction with the polypropylene layers so that the resulting packages are commercially viable as shelf stable products with no need for refrigeration. These various packaging structures with polypropylene layers and barrier layers require adhesive layers to bond the non-polar polypropylene layers to the polar barrier layers. The adhesive layers can vary in complexity of formulation to provide functional performance for different bonding requirements in a variety of packaging materials. For example, the packaging materials may have structures containing three layers, five layers, seven layers, up to thirteen layers, or more than thirteen layers. Adhesive concentrates, which can be diluted with polyolefins during the coextrusion process, provide flexibility to the converter in adjusting to different requirements, allow the converter to use the structural layers as adhesive layers as well where needed, and can be more economical than adhesive compositions that are pre-formulated with the polyolefin diluants.

Polypropylene-based adhesive concentrates in which the polypropylene is functionalized with high levels of grafted maleic anhydride typically have lower molecular weights than polyethylene-based adhesive concentrates of equivalent maleation because of the tendency of propylene polymer towards chain scission, also commonly referred to as "beta scission" or "vis breaking," in the presence of peroxides. Without wishing to be held to theory, it is believed that functionalized polypropylene molecules having sufficiently low molecular weight must migrate from the bulk of the adhesive or "tie" layer to the interface with the polar polymer. There, the functionalized low molecular weight polypropylene molecules are available to react chemically or to form other adhesive interactions with the polar polymer. Disadvantageously, however, low molecular weight grafted polypropylene adhesives have been described as difficult to process, difficult to pelletize, and as having lower adhesion strength.

In coextrusion processes, the dissimilar layers that need to be bonded are in contact with the molten adhesive for a very short time, particularly in commercial production where the line speeds for some processes are very high. Therefore, useful polypropylene adhesives provide good adhesive strength in high speed coextrusion processes and have a suitable amount of functionalized polypropylene molecules that are sufficiently low in molecular weight to migrate to the interface with the polar polymer during the short contact time, while avoiding one or more disadvantages associated with lower molecular weight, for example, deficiencies in physical properties, such as rigidity and moisture transfer rates, and difficulties with pelletization.

Several approaches to increase the effective molecular weight of maleate-grafted polypropylene have been described. See, for example, U.S. Pat. No. 6,716,928, which describes functionalized propylene polymer products having higher amounts of grafted acid or acid derivative, preferably while maintaining relatively low MFRs. These grafted polymers may also be formulated into blends. See also U.S. Pat. No. 7,071,259, which describes the use of compositions comprising a mixture of two different functionalized propylene polymers as coupling/compatibilizing agents. Finally, U.S. Pat. No. 5,451,639 describes propylene copolymers grafted with α,β-ethylenically unsaturated carboxylic acids or carboxylic acid derivatives, methods of synthesizing the grafted propylene copolymers, and the use of the grafted propylene copolymers as adhesion promoters.

It is nevertheless apparent from the foregoing that there remains a need for an adhesive composition, and in particular for an adhesive concentrate, that provides high adhesion, good structural strength and other desired mechanical properties at low cost in multilayer coextruded structures that have from two or three layers to more than thirteen layers. The multilayer coextruded structures are particularly useful in packaging applications and have other useful and beneficial applications as well. The multilayer coextruded structures are especially useful in food packaging materials.

SUMMARY OF THE INVENTION

Provided herein is a polypropylene composition comprising an anhydride-grafted impact polypropylene copolymer ("impact co-PP"), wherein the weight percentage of grafted anhydride monomer (G) in the anhydride-grafted impact co-PP and the melt flow rate (M) of the anhydride-grafted impact co-PP are related by the equation $G/M*100 \leq 0.5$; wherein the melt flow rate (M) at 230° C. under a 2.16 kg load is measured or calculated; and wherein the weight percentage is based on the total weight of the anhydride-grafted impact co-PP.

Further provided herein is a polypropylene composition comprising a co-grafted blend of at least one impact co-PP and at least one random polypropylene copolymer ("random co-PP"), wherein the impact co-PP and the random co-PP are co-grafted with a grafting monomer selected from the group consisting of ethylenically unsaturated carboxylic acids and derivatives of ethylenically unsaturated carboxylic acids.

Further provided herein is a process for producing the co-grafted blend. In this process, a blend of polypropylene copolymers is melt mixed and simultaneously randomly grafted with maleic anhydride in the presence of an organic peroxide within a twin screw extruder. The unreacted maleic anhydride monomers can be removed by vacuum extraction, for example.

Further provided herein are multilayer structures comprising the polypropylene composition. The multilayer structures comprise the substructure "PP*/B" or "PP tie/B", wherein the symbol "I" denotes adjacent layers, the symbol "B" denotes a barrier structure comprising at least one layer comprising a barrier resin, and the symbols "PP*" and "PP tie" denote a layer comprising the polypropylene composition. In addition, the layer designated "PP*" has a volume greater than 20 vol % and the layer designated "PP tie" has a volume of 5 to 8 vol %, based on the total volume of the multilayer structure, and assuming the layer thicknesses are constant.

DETAILED DESCRIPTION

Unless otherwise defined, all technical and scientific terms used herein have the same meaning as commonly understood by one of ordinary skill in the art to which this invention belongs. Although methods and materials similar or equivalent to those described herein can be used in the practice or testing of the present embodiments, suitable methods and materials are described below. The materials, methods, and Examples described herein are illustrative only and not intended to be limiting. Unless otherwise defined, numerical ranges include both endpoints and all values between the endpoints.

As used herein, the terms "comprises," "comprising," "includes," "including," "has," "having," "contains," "containing" or any other variation thereof, refer to a non-exclusive inclusion. For example, a process, method, article, or apparatus that comprises a list of elements is not necessarily limited to those elements, but may include other elements not expressly listed or inherent to such process, method, article, or apparatus.

The transitional phrase "consisting essentially of" limits the scope of a claim to the specified materials or steps and those that do not materially affect the basic and novel characteristic(s) of the claimed invention. "A 'consisting essentially of' claim occupies a middle ground between closed claims that are written in a 'consisting of' format and fully open claims that are drafted in a 'comprising' format." Where an invention or a portion thereof is described with an open-ended term such as "comprising," it is to be understood that, unless otherwise stated in specific circumstances, this description also includes a description of the invention using the terms "consisting of" and "consisting essentially of".

Further, unless expressly stated to the contrary, "or" refers to an inclusive "or" and not to an exclusive "or." For example, a condition A or B is satisfied by any one of the following: A is true (or present) and B is false (or not present), A is false (or not present) and B is true (or present), and both A and B are true (or present).

Also, use of "a" or "an" are employed to describe elements and components of the invention. This is done merely for convenience and to give a general sense of the invention. This description should be read to include one or at least one and the singular also includes the plural unless it is obvious that it is meant otherwise.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such.

In addition, the ranges set forth herein include their endpoints unless expressly stated otherwise in limited circumstances. Further, when an amount, concentration, or other value or parameter is given as a range, one or more preferred ranges or a list of upper preferable values and lower preferable values, this is to be understood as specifically disclosing all ranges formed from any pair of any upper range limit or preferred value and any lower range limit or preferred value, regardless of whether such pairs are separately disclosed.

Moreover, where a range of numerical values is recited herein, unless otherwise stated in specific circumstances, the range is intended to include the endpoints thereof, and all integers and fractions within the range. It is not intended that the scope of the invention be limited to the specific values recited when defining a range. Finally, when the term "about" is used in describing a value or an end-point of a range, the disclosure should be understood to include the specific value or end-point referred to.

As used herein, the term "copolymer" refers to polymers comprising copolymerized units resulting from copolymerization of two or more comonomers. In this connection, a copolymer may be described herein with reference to its constituent comonomers or to the amounts of its constituent comonomers, for example "a copolymer comprising ethylene and 15 weight % of acrylic acid", or a similar description. Such a description may be considered informal in that it does not refer to the comonomers as copolymerized units; in that it does not include a conventional nomenclature for the copolymer, for example International Union of Pure and Applied Chemistry (IUPAC) nomenclature; in that it does not use product-by-process terminology; or for another reason. As used herein, however, a description of a copolymer with reference to its constituent comonomers or to the amounts of its constituent comonomers means that the copolymer contains copolymerized units (in the specified amounts when specified) of the specified comonomers. It follows as a corollary that a copolymer is not the product of a reaction mixture containing given comonomers in given amounts, unless expressly stated in limited circumstances to be such.

As used herein, the term "finite amount" refers to an amount that is greater than zero.

The term "functionalize" as used herein refers to a free radical grafting reaction through which a reactive monomer is attached to a polymer backbone, for example to a polypropylene homopolymer or copolymer backbone, by covalent bonding.

The terms "grafting agent" and "grafting monomer" are synonymous and used interchangeably herein to refer to ethylenically unsaturated carboxylic acids, anhydrides of ethylenically unsaturated carboxylic acids, and other derivatives of the ethylenically unsaturated carboxylic acids.

Unless otherwise specified under limited circumstances, all measured melting points, enthalpies of fusion and heats of fusion are determined by differential scanning calorimetry (DSC) at a scan rate of 10° C./min in the second heating scan, according to the specifications of ASTM D3418.

Finally, unless otherwise specified under limited circumstances, all measured melt flow rates are determined according to ASTM method D1238. Moreover, as used herein in the context of melt flow rates, the term "to determine" refers to measurements made under the stated conditions and also to measurements that are made under other conditions and converted, by correlation or by extrapolation, for example, to a value that corresponds to a measurement under the stated conditions.

Provided herein is an adhesive composition. The adhesive composition is a polypropylene composition comprising one or more polypropylene copolymers that are functionalized with an ethylenically unsaturated carboxylic acid or a derivative of an ethylenically unsaturated carboxylic acid.

Suitable polypropylene copolymers include impact polypropylene copolymers (impact co-PP) and random homophasic polypropylene copolymers (random co-PP). Impact co-PPs are sometimes referred to as "block co-PPs" or, more formally, "intimately mixed heterophasic co-PPs". It has now surprisingly been shown that functionalized polypropylene compositions containing at least one grafted impact co-PP or a co-grafted blend containing at least one impact co-PP and at least one random co-PP have superior bonding properties and can adhere to materials that are otherwise difficult to bind without risk of delamination or separation. In addition, it has surprisingly been shown that there is a utility for adhesive compositions having melt flow rate greater than or equal to 200 g/10 min, as determined at 230° C. and 2.16 kg. Moreover, these compositions or blends can be manufactured easily and economically, relative to other polypropylene-based adhesives.

Impact co-PPs and random co-PPs are described in detail in, for example, U.S. Provisional Patent Appln. No. 62/036, 817 by Lee, I-H., et al., filed on Aug. 13, 2014, to which published application PCT International Appln. Publn. No. WO2016/025663 claims priority. Significantly, the impact co-PPs and random co-PPs suitable for use herein as grafting base resins or "backbones" are not hydrocarbon elastomers.

Suitable impact co-PPs for grafting comprise copolymerized repeat units of propylene and one or more other comonomers. Suitable comonomers include, without limitation, alpha-olefins. Preferably, the alpha-olefins have 2 or 4 to 10 carbon atoms, specifically ethylene, 1-butene, 1-hexene, 1-heptene, 1-octene, 1-nonene, and 1-decene. Ethylene is a more preferred comonomer.

In addition, suitable impact co-PPs for grafting have a finite amount up to about 90 wt % of copolymerized repeat units of propylene. Complementarily, suitable impact co-PPs have at least about 10 wt % of copolymerized repeat units of the one or more other comonomers. The percentages are based on the total weight of the impact co-PP, prior to grafting or co-grafting. The term "complementarily" as used herein in the context of copolymer compositions means that 100 wt % is the sum of the weight percentages of the various copolymerized repeat units in the copolymer. Preferred impact co-PPs comprise about 10 wt % or more, or about 10 to about 25 wt %, or about 10 to about 20 wt %, or about 10 to 15 wt % of copolymerized units of the other comonomer(s). More preferably, the other comonomer is ethylene. In this connection, the comonomer content of polypropylene copolymers is typically measured by nuclear magnetic resonance spectroscopy ($^{13}$C-NMR).

The physical properties of suitable impact co-PPs for grafting include a melt flow rate that ranges from 0.1 to 30 g/10 min (MFR at 230° C./2.16 kg), and a heat of fusion between 30 and 80 joules/gram, as measured in the second heat by differential scanning calorimetry (DSC) according to ASTM Method No. D-3418.

Moreover, as described above, impact co-PPs are intimately mixed heterophasic copolymers. Suitable impact co-PPs may be produced by any known process. For example, impact co-PPs may be produced in a multi-stage reactor, with propylene generally first polymerized by itself or with ethylene (or other alpha-olefin) in the first reactor phase to form the semicrystalline matrix. Low crystallinity or amorphous segments of propylene and ethylene (or other alpha-olefin) are then copolymerized, in a second stage or in subsequent stages, in the presence of the polymer produced in the first reactor. This process produces heterophasic propylene copolymers characterized by an intimate mixture of a more crystalline phase of an isotactic propylene homopolymer, if only propylene monomer is used in the first reactor phase, or a more crystalline phase of a propylene-rich copolymer, if other $C_2$ or $C_4$ to $C_{10}$ alpha-olefin(s) are also used; and a rubbery phase of propylene with other $C_2$ or $C_4$ to $C_{10}$ alpha-olefin(s) that is produced in the second or subsequent stages of the polymerization.

Intimately mixed heterophasic copolymers may be identified or characterized by their thermal properties, for example as measured by DSC. In particular, the melting points of the impact copolymers will be dominated by the more crystalline matrix segment of the copolymer. More specifically, the melting temperature of intimately mixed heterophasic polypropylene copolymers varies, depending on whether the crystalline phase is a propylene homopolymer or a propylene copolymer. In particular, the melting point of an impact co-PP having propylene homopolymer as the more crystalline phase is about 165° C., and the melting point of an impact co-PP having propylene copolymer as the more crystalline phase is lower. In suitable impact co-PPs, a DSC melting peak will exist in the region of 160 to 170° C., if only propylene monomer is used in the first stage of the synthesis reaction. If propylene and one or more comonomers such as ethylene or butene, for example, are used in the first stage of the reaction, the resulting propylene-rich impact co-PP will be characterized by a DSC melting peak in the region below 150° C. The second or subsequent stage reaction may produce an amorphous phase if ethylene or a $C_4$ to $C_{10}$ alpha-olefin comonomer is inserted with a relatively high degree of randomness into the polymer backbone as it forms. The second or subsequent stage reaction normally also produces some ethylene-rich segments in the rubbery phase, however. These ethylene-rich segments, which result from a relatively low degree of randomness in the comonomer distribution along the polymer backbone, can crystallize and are characterized by a peak in the DSC melting curve in the region of 110 to 125° C. It is likely that this second peak will be minor, compared to the peak produced by the propylene-rich crystalline phase of the impact co-PP. Those of skill in the art are aware that the integral of the second DSC peak is proportional to the amount of crystallized ethylene-rich segments in the polymer sample.

Suitable impact co-PPs are commercially available from several manufacturers, including, for example, LyondellBasell of Houston, Tex., and the ExxonMobil Chemical Company of Spring, Tex.

Suitable random co-PPs for grafting comprise copolymerized repeat units of propylene and one or more other comonomers. Suitable comonomers include, without limitation, alpha-olefins. Preferably, the alpha-olefins have 2 or 4 to 10 carbon atoms, specifically ethylene, 1-butene, 1-hexene, 1-heptene, 1-octene, 1-nonene, and 1-decene. Ethylene is a more preferred comonomer.

In addition, suitable random co-PPs for grafting have more than 90 wt % of copolymerized repeat units of propylene. Complementarily, suitable random co-PPs have a finite amount up to about 10 wt % of copolymerized repeat units of the one or more other comonomers. The percentages are based on the total weight of the random co-PP, prior to grafting or co-grafting. Preferred random co-PPs comprise 10 wt % or less of copolymerized units of the other comonomer(s). More preferably, the other comonomer is ethylene.

Finally, suitable random co-PPs for grafting have a melt flow rate (measured at 230° C. under a weight of 2.16 kg) that is preferably less than 30 g/10 min, and more preferably less than 10 g/10 min.

Random co-PPs may be synthesized by any suitable process. For example, propylene copolymers can be prepared in the presence of Ziegler-Natta catalyst systems or single-site catalyst systems, such as metallocene catalyst systems. The comonomers are inserted into the main polymer chain in a random manner so that its crystallinity is disrupted, leading to a decrease in the melting point of the copolymer. For example, the melting point of homopolypropylene is from about 160° C. to about 170° C.; in contrast, the melting point of random co-PP is from about 130° C. to about 158° C., as determined by DSC and depending on the amount and type of α-olefin comonomer.

Alternatively, suitable random co-PPs are commercially available from several manufacturers, including, for example, LyondellBasell and INEOS Olefins and Polymers USA of League City, Tex.

In the adhesive composition, the polypropylene copolymer(s) are modified or functionalized by grafting or co-grafting with at least one grafting agent. Suitable grafting agents include, without limitation, ethylenically unsaturated carboxylic acids. Preferred grafting agents include, without limitation, acrylic acid, methacrylic acid, fumaric acid, maleic acid, nadic acid (5-norbornene-2,3-dicarboxylic acid or, more rigorously, bicyclo[2.2.1]hept-5-ene-2,3-dicarboxylic acid), citraconic acid, and itaconic acid. Also suitable are derivatives of the ethylenically unsaturated carboxylic acids, such as for example anhydrides; metal salts; esters, including monoesters and diesters; amides; imides; and the like. Acid anhydrides are preferred grafting agents. The more preferred grafting agents are maleic acid and maleic anhydride. Maleic anhydride is a still more preferred grafting agent.

Preferably, the grafted or co-grafted polypropylene copolymer(s) contain from 0.5 to 4 wt % of grafted residues of the grafting monomer, based on the total weight of the grafted or co-grafted polypropylene copolymer(s). More preferably, the grafted or co-grafted polypropylene copolymer(s) contain from 0.5 wt % to 2.5 wt % of grafted residues of the grafting monomer. Still more preferably, the grafted or co-grafted polypropylene copolymer(s) contain from 1.2 wt % to 1.8 wt %, 1.2 wt % to 1.6 or 1.65 wt %, or 1.2 wt % to 1.5 wt % of grafted residues of the grafting monomer.

The level of grafting may be adjusted to achieve the desired properties in the adhesive composition. For example, other factors being held constant, a higher level of anhydride functionalization may improve the adhesion of the tie layer to the polar layer by covalent bonding, by polar interactions, or by other mechanisms. In general, the level of grafting is controlled by adjusting the amount of grafting monomer in the reactor, by adjusting the reactor temperature or residence time, by selecting a suitable radical initiator, for example using its "half-life decomposition temperature," that is, the relationship between its half-life and its decomposition temperature, or by adjusting the amount of radical initiator, if any. These parameters are discussed in more detail below, with respect to maximizing grafting efficiency.

The propylene copolymers may be functionalized by any suitable process known in the art. For example, functionalization can be carried out in the melt without a solvent, as described in U.S. Pat. No. 5,367,022, issued to Kiang et al.; U.S. Pat. No. 6,716,928, issued to Botros; and U.S. Pat. No. 7,030,188, issued to Botros et al. Examples of suitable vessels for melt grafting include, without limitation, a heated extruder, a Brabender™ mixer, a Banbury™ mixer, another internal mixer or kneading machine, a roll mill, and the like. Alternatively, U.S. Pat. No. 5,523,358, issued to Hirose et al., describes grafting reactions that are conducted in solution, in dispersion, and in fluidized beds.

When the functionalization is carried out in a melt process, the grafting monomer is typically added in an amount of about 1 to about 5 wt %, based on the total weight of the polypropylene(s).

The grafting reaction may be carried out in the presence of a radical initiator such as a suitable organic peroxide, organic perester, or organic hydroperoxide. Organic peroxides are preferred radical initiators. Examples of suitable peroxide catalysts include, without limitation, 1,1-bis(tert-butylperoxy)cyclohexane; n-butyl-4,4-bis(tert-butylperoxy-valerate); 1,1-bis(tert-butylperoxy)-3,3,5-trimethylcyclohexane; 2,2-bis(tert-butylperoxy)butane; dicumylperoxide; tert-butylcumylperoxide; $\alpha,\alpha'$-bis(tert-butylperoxypreoxy-isopropyl) benzene; di-tert-butylperoxide (DTBP); 2,5-dimethyl-2,5-di(tert-butylperoxy) hexane; and the like. Preferred organic peroxides include 2,5-dimethyl-2,5-di(tert-butylperoxy) hexane and 2,5-dimethyl-2,5-di(tert-butylperoxy) hexyne-3. The radical initiator, when used, can be added in its neat form or as a master-batch. The amount of radical initiator added to the grafting reaction mixture is preferably from 100 ppm to 10,000 ppm, or from 500 ppm to 8000 ppm or from 1000 ppm to 7500 ppm, or from 2000 ppm to 5000 ppm, based on the total weight of the polypropylene(s) prior to grafting. In some notable embodiments, the radical initiator is a peroxide initiator, and it is added in an amount of 2000 ppm to 5000 ppm, based on the total weight of the polypropylene(s) prior to grafting.

The grafting conditions in the extruder are adjusted such to achieve high grafting efficiency. More specifically, the variables of barrel temperatures, extruder rate, and screw speed are adjusted so that the temperature in the reaction zone is greater than the polypropylene melting temperature(s) and also greater than the decomposition temperature of the radical initiator, if any. The upper limit of the barrel temperature(s), however, is selected to allow for quick, homogeneous mixing while preventing the rapid vaporization or decomposition of low molecular weight reagents. Moreover, the reaction mixture's residence time in the reaction zone is managed so that there is insufficient time for undesirable degradation reactions to develop. Finally, the reaction temperature is preferably also managed so that the grafted polymer melt may be cooled quickly and conveniently for pelletization.

Volatile removal, for example the removal of unreacted monomer at the end of the grafting reaction, may be carried out by any conventional method. These methods may include vacuum extraction or the use of a stripping agent at the end of the grafting process. A suitable stripping agent can include but is not limited to inert gas; organic solvent; suitable aqueous solution, such as salt solution; and water.

In some preferred adhesive compositions, one or more impact co-PPs are grafted with a grafting agent. In other preferred adhesive compositions, at least one impact co-PP and at least one random co-PP are co-grafted. More specifically, a blend of co-PPs containing at least one impact co-PP is melt mixed and uniformly blended. The melt-blended co-PPs are simultaneously and randomly grafted with one or more grafting agents through a free radical reaction. Again, extruder conditions are adjusted to achieve quick, homogeneous mixing of the reaction mixture. In other respects, the equipment and parameters for the functionalization reaction are selected and adjusted as described immediately above.

Preferably, the melt-mixed blend for co-grafting includes more than 40 wt % of at least one impact co-PP containing about 10 wt % or more of copolymerized ethylene comonomer and complementarily up to 60 wt % of a random co-PP containing about 10 wt % or less of copolymerized ethylene comonomer. More preferably, the melt-mixed blend for co-grafting comprises from about 20% to about 50 wt % or from about 20% to about 40 wt % or from about 30% to about 45 wt % of at least one random co-PP and complementarily from about 50 wt % to about 80 wt % or from about 60 wt % to about 80 wt % or from about 55 wt % to about 70 wt % of at least one impact co-PP. The weight percentages of the co-PPs in this blend are based on the total weight of the blend, prior to co-grafting.

Non-limiting examples of suitable adhesive compositions include the following polypropylenes, which are grafted or co-grafted with maleic anhydride:
an impact co-PP having ≥10% by weight of copolymerized ethylene;
an impact co-PP having ≥10% by weight of copolymerized ethylene and a random co-PP having <10% by weight of copolymerized ethylene; and
at least one impact co-PP having ≥10% by weight of copolymerized ethylene and at least one random co-PP having <10% by weight of copolymerized ethylene.

Surprisingly, adhesives comprising the co-grafted polypropylenes, which in turn contain at least one impact co-PP and at least one random co-PP, have a bonding strength that is substantially increased, compared to the bonding strength of blends of individually grafted polypropylene co-PP compositions that are adhered to EVOH, polyamide, and similar materials, including other barrier resins.

The melt flow rate of the grafted or co-grafted polypropylene copolymer(s) may also be adjusted to achieve the desired properties in the adhesive composition. For example, in an adhesive that has an unsuitably low melt flow rate, the functional groups may not be able to migrate quickly enough to the interface. Moreover, an adhesive with an unsuitably low melt flow rate may not be processible at a convenient temperature, at the preferred line speed of the conversion processes. Conversely, when the melt flow rate is too high, the adhesive may not have the physical integrity to form an effective tie layer that is well-anchored to the other polypropylene-based layer. Alternatively, when the adhesive composition has an unsuitably high melt flow rate, the thermal properties of the end use products may also be insufficient. For example, multilayer film or sheet structures or rigid packaging containers may not have adequate mechanical properties at high temperatures and so may not be able to withstand cooking or retort conditions.

In general, the melt flow rate of the grafted or co-grafted polypropylene copolymer(s) is controlled by selecting the melt flow rate of the base resin(s) for grafting, or by controlling the extent of beta-scission during the grafting reaction. Beta-scission may be controlled by adding a suitable amount of radical initiator in the grafting reaction mixture or by adjusting the temperature of the grafting reaction, for example. Some of these parameters are discussed in more detail above, with respect to the grafting process.

The melt flow rate of the adhesive composition is preferably relatively high, however, for the reasons discussed above relating to molecular migration and processing speed. Accordingly, the functionalized polypropylene(s) preferably have a melt flow rate (190° C./325 g) between about 4 and about 32 g/10 min. In some embodiments, the melt flow rate (190° C./325 g) is in the range of from 4.5 to 28 g/10 min, or from 5.25 to 26 g/10 min, or from 6.25 to 24 g/10 min, or from 6.25 or 7 to 21 g/10 min. In addition, the polypropylene adhesive composition has a melt flow rate (230° C./2.16 kg) from 200 to 600 g/10 min. In some embodiments, the melt flow rate (230° C./2.16 kg) is in the range of from 140 to 900 g/10 min, or from 150 to 800 g/10 min, or from 175 to 750 g/10 min, or from 200 to 700 g/10 min or from 200 or 225 to 600 g/10 min. The melt flow rate (190° C./325 g) is measured according to ASTM D-1238 using the standard die. The melt flow rate (230° C./2.16 kg) may be measured according to ASTM D-1238 using the standard die. Alternatively, it may be calculated or estimated by correlation.

Grafted impact co-PPs having a suitably high melt flow rate are characterized by a G/M ratio of 0.5 or less, preferably 0.2 to 0.5 or 0.2 to 0.4. More specifically, the weight percentage of grafted anhydride monomer (G) in the anhydride-grafted impact co-PP and the melt flow rate (M) at 230° C. under a 2.16 kg load of the anhydride-grafted impact co-PP are related by the equation (G/M)*100≤0.5. In the anhydride-grafted impact co-PP, G and M are preferably related by the equations 0.2≤(G/M)*100≤0.5 or 0.2≤(G/M)*100≤0.4. Similarly, the weight percentage of grafted anhydride monomer (G) in the co-grafted blend and the melt flow rate (M) at 230° C. under a 2.16 kg load of the co-grafted blend are related by the equation (G/M)*100≤20, more preferably (G/M)*100≤15, (G/M)*100≤10, (G/M)*100≤7.5, (G/M)*100≤5, (G/M)*100≤2, (G/M)*100≤1, (G/M)*100≤0.5, or (G/M)*100≤0.2. It is also preferable for the G/M ratio of the co-grafted blend to be at least 0.01, 0.1, or 0.2. For example, G and M of the co-grafted blend are related by the equation 0.01≤(G/M)*100≤20, or by 0.2≤(G/M)*100≤0.5, or by another such equation. This paragraph is to be understood as specifically disclosing all ranges of G/M formed from any pair of any upper range limit or preferred value and any lower range limit or preferred value, regardless of whether such pairs are separately disclosed. Finally, in these equations, the melt flow rate M is measured, extrapolated or calculated, and the weight percentage G is based on the total weight of the anhydride-grafted impact co-PP.

The adhesive composition may further contain small amounts of one or more additives commonly used and known in the art, such as anti-oxidants; anti-blocking agents; stabilizers, including ultra-violet stabilizers; plasticizers; processing aids; flow enhancing additives; flow reducing additives; lubricants; flame retardants; nucleating agents and fillers. One notable group of additives is used to compatibilize the interfaces of layers in multilayer structures. This group includes PE-b-PEO, for example. Other suitable additives, additive levels, and methods of incorporating the additives into the adhesive compositions may be found in the *Kirk-Othmer Encyclopedia of Chemical Technology*, 5th Edition, John Wiley & Sons (New Jersey, 2004). In general, the total amount of these other additives, if present, is less than 5 wt %, less than 3 wt %, less than 2 wt %, or less than 1 wt %, based on the total weight of the adhesive composition.

The adhesive compositions may further comprise at least one non-grafted polyolefin. Preferred polyolefins include but are not limited to ungrafted random co-PP, ungrafted homo-PP, and ungrafted impact co-PPs. The ungrafted random and impact co-PPs can be the same as or different from the base resins of the (co)-grafted polypropylenes. Ungrafted homopolypropylenes can also be blended with the adhesive compositions. Homopolypropylene polymers can be manufactured by any known process in the presence of Ziegler-Natta catalyst systems or metallocene catalyst systems.

The adhesive compositions may further comprise at least one additional grafted polyolefin. Preferred additional grafted polyolefins include but are not limited to an additional grafted random co-PP, a grafted homo-PP, and an additional grafted impact co-PP. The base resins of the additional grafted random co-PPs and additional grafted impact co-PPs can be the same as or different from the base resins of the (co)-grafted polypropylenes that are required components of the adhesive composition. The level and homogeneity of functionalization of the additional grafted random co-PPs and additional grafted impact co-PPs can be the same as or different from those of the (co)-grafted polypropylenes that are required components of the adhesive compositions. Homopolypropylene polymers (homoPP) can be functionalized according to the procedures described hereinabove with respect to propylene copolymers. The suitable and preferred grafting monomers and levels of functionalization of the additional grafted polyolefins are as described above with respect to the (co)-grafted polypropylenes that are required components of the adhesive compositions.

The adhesive composition described herein may also comprise one or more elastomeric polymers, such as a hydrocarbon elastomer, an ethylene alpha olefin copolymer, or a propylene alpha-olefin copolymer, for example.

As used herein, the term "hydrocarbon elastomer" refers to a copolymer comprising copolymerized units of comonomers that comprise only carbon and hydrogen. In addition, suitable hydrocarbon elastomers have a sufficiently low degree of crystallinity such that their heat of fusion is below about 30 joules/gram. For most hydrocarbon elastomers, the heat of fusion is below 10 joules/gram, and many have no measurable heat of fusion at all.

Preferably, the hydrocarbon elastomer is a copolymer of ethylene and one or more alpha-olefins selected from the group consisting of propylene; 1-butene; 1-pentene; 1-hexene; 1-octene; 4-methyl-1-pentene; 1,4-butadiene; and 1,4-hexadiene. Examples of suitable hydrocarbon elastomers include, without limitation, ethylene propylene rubber, ethylene propylene diene rubber (EPDM), styrene-butadiene thermoplastic rubber, and styrene-isoprene thermoplastic rubber.

Suitable ethylene alpha-olefin copolymers contain more than about 5 mole % of copolymerized residues of the alpha-olefin comonomer and have a density of 0.900 g/cc or lower. Preferred alpha-olefin comonomers include 1-butene, 1-hexene and 1-octene.

Suitable propylene alpha-olefin copolymers are described in detail in PCT Intl. Appln. Publn. No. WO2016/025663, cited above. Briefly, however, suitable propylene alpha-olefin copolymers contain more than about 8 or about 10 mole % of copolymerized residues of the alpha-olefin comonomer. Suitable alpha-olefins include ethylene, 1-butene, 1-hexene and 1-octene. Preferred alpha-olefins include ethylene and 1-butene. Significantly, propylene alpha-olefin copolymers that are suitable for use as hydrocarbon elastomers are not suitable for use as impact co-PPs and random co-PPs described above as base resins for functionalization.

The mole percentages of copolymerized alpha-olefin residues in the ethylene alpha-olefin copolymers and propylene alpha-olefin copolymers are based on the total number of moles of copolymerized residues in the ethylene alpha-olefin copolymers and propylene alpha-olefin copolymers, respectively. Finally, ethylene alpha-olefin copolymers and propylene alpha-olefin copolymers can be synthesized using a Ziegler-Natta catalyst system or a single site catalysis system, such as a metallocene catalyst system.

The base resins of the additional grafted polyolefins, the ungrafted polyolefins and the elastomeric polymers described above as suitable for use in the adhesive compositions preferably have melt flow rates (measured at 230° C. at 2.16 kg) of about 0.5 to about 150 g/10 min.

As described above, the functionalized polypropylene(s) and the additives, if any, may be combined with one or more of the grafted polyolefins, ungrafted polyolefins and elastomeric polymers (collectively, the matrix material(s)) to produce the adhesive composition. The relative amounts of the functionalized polypropylene(s) and the matrix material(s) are limited by the compatibility of the components and the ability of the formulated composition to achieve some threshold of bonding or adhesion to a substrate, preferably to a substrate comprising a polyamide or an EVOH. Stated alternatively, the matrix materials are optional, and thus may be present at a level of 0 wt % in the adhesive composition. Complementarily, the adhesive compositions may consist of or consist essentially of the functionalized polypropylene(s) and the additive(s), if any.

When the adhesive composition includes the additional ungrafted polyolefin(s), they may be present in a finite amount, or in an amount of from about 65 up to about 99.99 wt %, or up to about 99.90 wt %, about 99.5 wt %, about 99.0 wt %, about 98.0 wt %, about 97.5 wt %, about 97.0 wt %, about 95 wt %, about 93.0 wt %, about 92.5 wt %, 90 wt %, about 87.5 wt %, about 85 wt %, about 80 wt %, about 75 wt %, or about 65 wt %, based on the total weight of the adhesive composition. In some notable embodiments, the amount of the additional ungrafted polyolefin is about 65 wt % to about 95 wt %, based on the total weight of the adhesive composition. In some notable embodiments, the total amount of the functionalized polypropylene(s) and the additional ungrafted polyolefin(s) is from about 5 to about 35 wt %, again based on the total weight of the adhesive composition.

Complementarily, the functionalized polypropylene(s), the additive(s) if any, and the other matrix material(s) if any are present in a finite amount or in an amount of 0.01 wt % to about 35 wt %, or in an amount of from about 0.10 wt %, or about 1.0 wt %, or about 2.0 wt %, or about 2.5 wt %, or about 3 wt %, or about 5 wt %, or about 7 wt %, or about 7.5 wt %, to about 10 wt %, or about 12.5 wt %, or about 15 wt %, or about 20 wt %, or about 25 wt %, or about 35 wt %, again based on the total weight of the adhesive composition. Again, in some notable embodiments, the amount of the functionalized polypropylene(s), the additive(s) if any, and the other matrix material(s) if any is about 5 wt % to about 35 wt %, based on the total weight of the adhesive composition.

When the adhesive composition includes the additional grafted polyolefin(s), the total amount of the functionalized polypropylene(s) and the additional grafted polyolefin(s) is preferably at least a finite amount, or an amount of 0.01 wt % to about 35 wt %, or an amount of at least about 0.10 wt %, or about 1.0 wt %, or about 2.0 wt %, or about 2.5 wt %, or about 3 wt %, or about 5 wt %, or about 7 wt %, or about 7.5 wt %, based on the total weight of the adhesive composition. Further, the total amount of the functionalized polypropylene(s) and the additional grafted polyolefin(s) is preferably up to about 10 wt %, or about 12.5 wt %, or about 15 wt %, or about 20 wt %, or about 25 wt %, or up to about 35 wt %, again based on the total weight of the adhesive composition. In some notable embodiments, the total amount of the functionalized polypropylene(s) and the additional grafted polyolefin(s) is from about 5 to about 35 wt %, again based on the total weight of the adhesive composition.

In addition, the ratio of the amount of the additional grafted polyolefin(s) to the amount of the functionalized copolypropylene(s) may be any real number x such that 0<x<1. Preferably, the ratio ranges from 25:1 to 1:25, from 1:10 to 10:1, or from 1:5 to 5:1, or from 1:4 to 4:1, or from 1:3 to 3:1, or from 1:2 to 2:1, and more preferably the ratio is close to 1:1.

Further in connection with the adhesive composition that includes the additional grafted polyolefin(s), the additive(s) if any and the other matrix material(s) if any are present in a complementary amount of up to about 99.99 wt %, about 99.90 wt %, about 99.5 wt %, about 99.0 wt %, about 98.0 wt %, about 97.5 wt %, about 97.0 wt %, about 95 wt % wt %, about 93.0 wt %, about 92.5 wt %, 90 wt %, about 87.5 wt %, about 85 wt %, about 80 wt %, about 75 wt %, or about 65 wt %, based on the total weight of the adhesive composition. In some notable embodiments, the amount of the additive(s) if any and the other matrix material(s) if any is from about 65 to about 95 wt %, again based on the total weight of the adhesive composition.

Finally, when the adhesive composition includes the elastomeric polymer(s), they may be present in an amount of from 0 wt %, or in a finite amount, or in an amount of about 0.01 wt %, or about 0.10 wt %, or about 0.5 wt %, or about 1.0 wt %, or about 5 wt %, or in an amount of about 5 wt % up to about 30 wt % or about 40 wt %, based on the total weight of the adhesive composition. In some notable embodiments, the adhesive composition includes the elastomeric polymer(s) in an amount of from 5 to 30 wt %. Complementarily, the functionalized polypropylene(s), the additive(s) if any, and the other matrix materials if any are present in an amount of from about 60 or about 70 wt % to 100 wt %, or to 100 wt % less a finite amount, or to about 99.99 wt %, about 99.90 wt %, about 99.5 wt %, about 99.0 wt %, or about 95 wt %, or in an amount between about 5 wt % and about 30 wt % or about 40 wt %, again based on the total weight of the adhesive composition. In some notable embodiments, the functionalized polypropylene(s), the additive(s) if any, and the other matrix materials if any are present in an amount of from 70 to 95 wt %.

The functionalized polypropylene(s) can be combined by any method known to one skilled in the art with the one or more of the grafted polyolefins, ungrafted polyolefins, elastomeric polymers, and optional additive(s) described above to produce the adhesive composition. Suitable methods include, without limitation, dry blending or melt blending using a melt-mixing device, such as twin screw extruders, single screw extruders, Banburies, Buss-Kneaders, and the like. For example, pellets of each of the components may be admixed to form a dry blend or "pellet blend," which may be directly fed to the process for the formation of a packaging film, multilayer film, sheet or multilayer sheet, or molded part. Alternatively, pellets of each of the components may be fed separately to an extruder and melted together to form a "melt blend," which may be fed to the process for the formation of a packaging film, multilayer film, sheet or multilayer sheet, or molded part. In another alternative process, the melt blend may be processed into pellets containing the mixed components that may be fed subsequently to the process for the formation of a packaging film, multilayer film, sheet or multilayer sheet, or molded part. Any of the blend components may be dried to the extent desired before, during or after the blending process. Those of skill in the art are capable of choosing appropriate blending conditions based on the physical properties of the individual components, such as their melting temperatures and melt flow rates, for example.

The adhesive composition preferably has a relatively high melt flow rate, for at least the reasons set forth above with respect to the functionalized polypropylene(s). As is noted above, the high melt flow rate is favorable to desirable adhesive properties in the end-use parts and is also favorable to commercial production speeds in various converting processes such as extrusion coating, cast film and co-injection molding. The suitable and preferred values of the melt flow rate vary, however, depending on the end use of the adhesive composition and on the process by which the final article is converted or fabricated. In general, when the adhesive composition includes one or more matrix materials, it has a melt flow rate (230° C. and 2.16 kg) ranging from 0.5 to 150 g/10 min.

More specifically, adhesive compositions that include one or more matrix materials and that are intended for use in articles fabricated by coextrusion cast sheet, coextrusion pipe and coextrusion blow molding processes preferably have a melt flow rate (230° C. and 2.16 kg) ranging from 1 to 5 g/10 min. Adhesive compositions that include one or more matrix materials and that are intended for use in articles fabricated by coextrusion cast film, (co)extrusion coating and (co)extrusion lamination processes preferably have a melt flow rate (230° C. and 2.16 kg) ranging from 5 to 25 g/10 min.

In general, materials used in blown film processes are required to have a relatively low melt flow rate, because low melt flow rates are correlated with higher molecular weight and higher melt strength. For this reason, adhesive compositions of the prior art that include one or more matrix materials and that are intended for use in articles fabricated by coextrusion blown film processes are expected to exhibit optimal performance at melt flow rates (230° C. and 2.16 kg) ranging from 1 to 10 g/10 min. For example, Lyondell Basell offers polypropylene grades with melt flow rates ranging from 1 to 10 g/10 min (230° C., 2.16 kg) for blown and cast film extrusion, and Borealis AG of Vienna, Austria, offers polypropylene grades with melt flow rates ranging from 0.9 to 3 g/10 min (230° C., 2.16 kg) for blown film applications. Similarly to the bulk structural layers, grafted polypropylenes known in the art for use in adhesive applications are generally preferred to have a lower melt flow rate or a higher molecular weight. For example, U.S. Pat. No. 6,716,928, issued to Botros, describes commercial processing operations for adhesive applications in which the grafted polypropylenes preferably have a melt flow rate that is less than 300 g/10 min and more preferably less than 250 g/10 min. Surprisingly, however, it has now been discovered that the grafted impact co-PPs and the co-grafted co-PP blends described herein are processible on blown film equipment at relatively high melt flow rates. Accordingly, the adhesive compositions described herein that include one or more matrix materials and that are intended for use in articles fabricated by coextrusion blown film processes preferably have melt flow rates (230° C. and 2.16 kg) ranging from 100 to 1000 g/10 min, more preferably from 200 to 600 g/10 min, and still more preferably from 350 to 450 g/10 min.

Finally, adhesive compositions that include one or more matrix materials and that are intended for use in articles fabricated by co-injection molding processes preferably have a melt flow rate (230° C. and 2.16 kg) ranging from 10 to 150 g/10 min, or more preferably from 15 to 100 g/10 min.

Significantly, these melt flow rate ranges pertain to adhesive compositions that are produced by "pellet blend" or "melt blend" processes. In the case of adhesive compositions that are produced by "pellet blend" processes, the melt flow rates are estimated values, based on the ratios of the amounts of the pellet blend components and their melt flow rates.

The adhesive composition has many applications. Among these is use as an adhesive in multilayer packaging applications, especially in food packaging applications such as wraps, bags, pouches, or liners for beverage containers. The multilayer structure can comprise a predominantly polypropylene-based structural layer or "bulk layer." The structural layer may include any of a wide variety of polymers containing propylene repeat units such as, for example, propylene homopolymers; propylene α-olefin copolymers; polypropylene elastomers; ethylene propylene rubber (EPR) or ethylene propylene diene monomer rubber (EPDM). The propylene (co)polymers in the structural layer may be the same as or different from propylene (co)polymers described above with respect to base resins for grafting or as additional components of the adhesive compositions. Preferably, however, the multilayer structure includes a predominantly polypropylene-based structural layer that comprises a polypropylene homopolymer or a copolymer or terpolymer of propylene and an α-olefin. Preferred polypropylenes include, without limitation, semi-crystalline homopolymers, random copolymers, heterophasic or "block" impact copolymers, and terpolymers of propylene. Significantly, the structural layer may comprise the adhesive composition.

The properties of the materials in the structural layer are selected according to criteria known in the art, depending on the use for which the multilayer structure is intended. When used as an adhesive in packaging applications, the composition described herein is expected to have superior adhesive properties and also may impart impact resistance to the structures of which it is a component. Also advantageously, the adhesive composition can be pelletized on a commercial scale.

A multilayer structure disclosed herein can comprise a barrier resin layer, which may be selected from the group consisting of a polyamide, an ethylene vinyl alcohol copolymer (EVOH), or combinations of two or more thereof. Some preferred multilayer structures are three-layer structures, comprising, for example, a barrier layer surrounded by two structural layers.

Suitable polyamides include, for example, a homopolymer or copolymer of aliphatic polyamides and aliphatic/aromatic polyamides such as polyamide 6; polyamide 9; polyamide 10; polyamide 11; polyamide 12; polyamide 6,6; polyamide 6,6/6; polyamide 6,9; polyamide 6,10; polyamide 6,12; polyamides from 2,2-bis-(p-aminocyclohexyl)propane; polyamide 6I; polyamide 6T; polyamide 6I/6T; polyamides prepared from terephthalic acid and/or isophthalic acid and trimethylhexamethylenediamine as well as those prepared from adipic acid, azelaic acid; polyamides prepared from terephthalic acid and 4,4'-diamino-cyclohexylmethane; and polyamide MXD6, comprising m-xylylenediamine and adipic moieties; copolymers thereof, and combinations of two or more thereof.

In this connection, polyamides are typically described by a numbering system that indicates the number of carbon atoms in their constituent monomer(s). Amino acid polymers are designated by a single number, such as 6-nylon or nylon-6 for poly(ε-aminocaproic acid), also known as polycaprolactam. Polyamides derived from the copolymerization of diamines with diacids are designated by two numbers, the first representing the diamine, as in 66-nylon (or nylon-66 or nylon-6,6) for the copolymer of hexamethylenediamine and adipic acid; and nylon-6,10 for the copolymer of hexamethylenediamine and sebacic acid. In the context of describing polyamides, co-polymerized repeat units are separated by a slash (that is, "/"). For instance poly(hexamethylene adipamide-co-ε-caproamide) is abbreviated PA 66/6 or nylon- 66/6. When it is desired to indicate the amount of each repeat unit in the copolymer, the mole percentages follow in parentheses, for example "PA 66/6 (75/25)". The mole percentages are based on the total number of moles of repeat units in the copolymer.

One suitable polyamide is commercially available under the trademark SELAR® PA from E.I. du Pont de Nemours & Company of Wilmington, Del. (hereinafter "DuPont").

EVOH copolymers having a content of copolymerized ethylene repeat units ranging from about 24 mole % to about 48 mole %, based on the total number of moles of copolymerized repeat units in the EVOH copolymer, are also commercially available.

The selection of barrier resins to use in the multilayer structure may depend on the type of gas barrier required for the application, the conditions under which a package form is fabricated, the conditions at which the packaging content is being filled and subjected to, as well as the service conditions at which the packaged product is subjected to. It is possible to have one barrier layer or more than one barrier layer. It is possible to have more than one type of polymer in the different barrier layers. The disposition of the barrier layers in the multilayer structure can also include an outer skin layer where the layer provides both barrier properties and toughness or high temperature resistance. The disposition of the barrier layers in the multilayer structures may include a core barrier layer that contains both polyamide and ethylene vinyl alcohol layers. Suitable barrier layer combinations include PA/EVOH/PA, PA/EVOH/PA/EVOH, EVOH/PA/EVOH, or other configurations including more layers where PA refers to polyamide layer and EVOH refers to EVOH layer, and the forward slash "/" denotes "between layers" in the context of descriptions of multilayer structures.

A multilayer packaging structure may also optionally contain other structural layers such as polyethylene and ethylene copolymers, polyester homopolymers and copolymers, and styrene homopolymers and copolymers.

Multi-layer structures may also include structures in which the adhesive composition or the structural layer comprising the adhesive composition is adhered to one or more solid substrates such as oriented films and metal foils, and onto woven and non-woven fabrics, nettings or scrims. Optionally, the at least one solid substrate is coated with a chemical primer such as polyethylene imine. Examples of oriented films are biaxially oriented polypropylene (BOPP), biaxially oriented polyester (BOPET), and biaxially oriented nylon (BON or BOPA). Examples of metal foils are aluminum foil or metallized oriented films. Examples of fabrics, nettings or scrims are spunbonded polyolefins, woven polypropylene raffia, and polyester netting. These structures may be fabricated by well-known methods including melt extrusion coating or lamination, for example.

Illustrative examples of multilayer structures include the following, in which the term "homo" means homopolymer, "PP" is a polypropylene layer, "co-PP" denotes a layer of copolymer of propylene and α-olefin, "PA" is a polyamide layer, "EVOH" is an ethylene vinyl alcohol layer, "LLDPE" is a linear low density polyethylene layer, "VLDPE" is a very low density polyethylene layer, "EVA" is an ethylene vinyl acetate copolymer layer, "mPE" is a layer of polyethylene, including ethylene α-olefin copolymer, produced by metallocene catalysis or by a process using another single site catalyst, "PET" is a polyethylene terephthalate layer, "OPP" is oriented polypropylene, and "EMA" is an ethylene methacrylate copolymer layer that can also serve as tie layer. The abbreviation "tie" stands for a tie layer that can be the same as, or different from, a layer produced from the adhesive composition described herein. For example, the symbol "tie" may denote an adhesive layer that does not comprise a grafted impact co-PP or a co-grafted impact co-PP. A tie layer between a polyolefin layer, however, particularly a polypropylene or copolypropylene layer, and a polyamide or EVOH layer is preferably a layer produced from the above-disclosed composition and will be described here and elsewhere as "PP tie" to denote the adhesive composition described herein or a blend comprising the adhesive composition described herein, for example a blend of a grafted impact co-PP with a polypropylene or a copolypropylene. In some instances, the bulk PP layer of a structure is modified with the adhesive composition described herein without an intervening thin tie layer. In such cases, the bulk PP layer will be described with an asterisk (PP*). More specifically, the layer designated "PP*" has a volume greater than 20 vol % and the layer designated "PP tie" has a volume of 5 to 8 vol %, based on the total volume of the multilayer structure when the layer thicknesses are constant.

In addition, the term "PE tie" denotes an adhesive layer that comprises polyethylene including ethylene copolymers and an anhydride-grafted polyethylene or an anhydride-grafted ethylene copolymer. The ethylene copolymer may include copolymerized repeat units of one or more comonomers, including, without limitation, alpha-olefins such as 1-propene, 1-butene, and 1-octene. In some instances, the bulk PE layer of a structure is modified with an anhydride-grafted polyethylene or an anhydride-grafted ethylene copolymer without an intervening thin tie layer. In such cases, the bulk PE layer will be described with an asterisk (PE*). As used herein with respect to "PE*" and "PE tie" layers, the term "ethylene copolymer" refers to a polymer that includes more than 70 wt % of copolymerized repeat units of ethylene, based on the total weight of the ethylene copolymer. Analogously to the "PP*" and "PP tie" layers, the layer designated "PE*" has a volume greater than 20 vol % and the layer designated "PE tie" has a volume of 5 to 8 vol %, based on the total volume of the multilayer structure when the layer thicknesses are constant. Non-limiting examples of possible structures follow.

PP/PP tie/barrier layer(s)/PP tie/PP;

PP/PP tie/barrier layer(s)/PE tie/PE;

PP*/barrier layer(s)/PP*, including PP*/EVOH/PP* and PP*/PA/PP*;

PP*/barrier layer(s)/PE*;

PE*/barrier layer(s)/PP*;

PE/PE tie/barrier layer(s)/PP tie/PP;

PA/PP tie/PP/PP tie/barrier layer(s)/PE tie/PE/PE/(EVA or ionomer);

HomoPP/co-PP/PP tie/barrier(s)/PP tie/co-PP/homoPP;

HomoPP/co-PP/PP tie/PA/EVOH/PA/PE tie/LLDPE/VLDPE;

PA/PP tie/co-PP/PP tie/PA/tie/EVA/EVA;

PA/PP tie/co-PP/co-PP/PP tie/PA/EVOH/PA/tie/ethylene acid copolymer/ethylene ionomer;

co-PP/PP tie/EVOH/PE tie/mPE;

HomoPP/co-PP/PP tie/PA/EVOH/PA/tie/ethylene ionomer/ethylene acid copolymer; and PET/EMA/co-PP/PP tie/PA/EVOH/PA/tie/ethylene ionomer/ethylene ionomer;

Nonwoven//HomoPP/co-PP/PP tie//primer/OPP;

Co-PP*//primer/BON, wherein co-PP* comprises a blend of the bulking layer co-PP resin with the adhesive composition; and Co-PP/PP tie/PA/PP tie//primer/reverse-printed "OPET" (oriented polyethyelene terephthalate).

Preferred are multilayer structures that include a substructure selected from the group consisting of "PP tie/B/PP tie", "PP tie/B/tie", "PP tie/B/PE*", "PP*/B/PP*", "PP*/B/PE*", and "PP tie/B/PE tie", wherein the symbol "B" denotes a barrier structure comprising at least one layer comprising a barrier resin.

In each of the above embodiments, the symbol "/" indicates adjacent layers. In addition, the symbol "//" refers to the interface between a layer that was melt extruded onto a layer of solid substrate. Moreover, the second layer of any film or sheet may be the same as or different from the first layer of that film or sheet. Likewise, the third layer may be the same as or different from the first and second layers of that film or sheet, and so on. Furthermore, in some preferred embodiments of the invention, the adjacent layers are directly laminated to each other so that they are adjoining or, more preferably, contiguous.

The multilayer structures may be a film, sheet or laminate and may have any total thickness desired to provide the desired properties for the particular packaging operation such as a total thickness (a combined thickness of all layers) of about 15 mils to about 50 mils or less, or from about 0.3 to about 15 mils, about 1 to about 10 mils, or 1.5 to 8 mils. The laminates can be in the form of film, sheet or rigid part such as a bottle or a thermoformed cup or a pipe.

The multilayer structures may be made by any process known in the art, including blown film, cast film, cast sheet, extrusion coating, coextrusion coating, extrusion lamination, coextrusion lamination, extrusion blown film, coextrusion blown film, extrusion cast sheet or film, coextrusion cast sheet or film, extrusion pipe or sheet processes, coextrusion pipe or sheet processes, extrusion blow molding, coextrusion blow molding, injection molding, and co-injection molding. Co-injection manufacturing processes are of increasing interest in fabricating packaging structures and laminates and components of them. A preferred method is co-injection stretch blow molding (ISBM), which is described in European Patent Appln. Publn. No. 2 305 751 A1.

The following examples are provided to describe the invention in further detail. These examples, which set forth specific embodiments and a preferred mode presently contemplated for carrying out the invention, are intended to illustrate and not to limit the invention.

EXAMPLES

Materials and Methods

Melting points and heats of fusion were determined according to ASTM D3418 by differential scanning calorimetry (DSC), at a scan rate of 10° C./min in the second heating scan, using a Model Q2000 differential scanning calorimeter, available from TA Instruments of New Castle, Del.

The melt flow rate measured (MFRM) of the maleated polypropylenes in units of grams per 10 minutes was determined according to ASTM D1238 using the standard die (orifice diameter 2.095 mm (0.0825 in)) at 190° C. and under a load of 325 g, using a Model M 987 melt indexer, available from the Tinius Olsen Testing Machine Company of Horsham, Pa.). Significantly, the MFRM was obtained in a timely manner after the maleated polypropylenes were produced. Lengthy exposure of the maleated polypropylenes to humid conditions results in an inaccurate measurement of a low MFRM, because of acid formation.

The melt flow rate (MFR) of the maleated polypropylene at 230° C. and 2.16 kg load (ASTM D1238, using the standard die) was estimated from the MFRM using the following empirical correlation:

$$MFR = 27.788 * MFRM + 28.009$$

This correlation was developed by the following steps: (1) the MFRM of selected compositions was obtained as per ASTM D1238 using the standard die at 190° C. and under a load of 325 g; (2) the rheology of the same selected compositions was measured at 230° C. using a capillary rheometer (Model LCR 7001, manufactured by Alpha Technologies of Akron, Ohio) and the relationship of melt viscosity versus shear rate was determined at this temperature; (3) this relationship was used to estimate the MFR at 230° C. and 2.16 kg load with the ASTM D1238 standard die; (4) the above linear correlation between the MFRM and the estimated MFR was determined based on a regression analysis of data obtained for the same compositions using the two different forms of measurement.

The G/M ratio is as defined in the Detailed Description, above. More specifically, the weight percentage of grafted anhydride monomer (G) in the anhydride-grafted impact co-PP and the melt flow rate (M) at 230° C. under a 2.16 kg load of the anhydride-grafted impact co-PP are related by the equation $(G/M)*100 \leq 0.5$.

The nominal level of grafted maleic anhydride ("g-level", reported as a weight percentage based on the total weight of the (co-)grafted polypropylene(s)) was measured by Fourier transform infrared (FTIR) spectroscopy using a Nicolet Avatar 330 FTIR spectrophotometer, available from the Thermo Electron Corp. of Madison, Wis. Spectra were obtained from sample films prepared from the maleated polypropylenes. The integrations of the absorption peaks were calibrated using internally prepared standards.

Examples PP-1 to PP-15

Grafting reactions were carried out in an extruder with a propylene impact copolymer (impact co-PP) that was melt mixed with an organic peroxide and grafted with one or more reactive monomers through a free radical reaction.

Similarly, co-grafting reactions were carried out in an extruder. The individual polypropylene copolymers, including at least one impact co-PP, were fed through separate feeders into the throat of the extruder. Alternatively, a pre-blend of polypropylene copolymers containing at least one impact co-PP was fed into the throat of the extruder. The polypropylene copolymers were melt-mixed with an organic peroxide and co-grafted, simultaneously and randomly, with one or more reactive monomers through a free radical reaction.

Examples PP-2, PP-3, PP-4, PP-5, PP-6, PP-7, PP-8, PP-9, PP-10 and PP-11 were produced on an intermeshing co-rotating twin screw extruder with a diameter of 43 mm and a ratio of total barrel length to diameter of 48:1, available from KraussMaffei Berstorff GmbH of Hanover, Germany.

Examples PP-1, PP-13, PP-14 and PP-15 were produced on an intermeshing co-rotating twin screw extruder with a diameter of a 96 mm and a ratio of total barrel length to diameter of 48:1, also available from KraussMaffei Berstorff GmbH.

The organic peroxide DHBP (2,5-dimethyl-2,5-di(tert-butylperoxy)-hexane) was added to the extruder in the form of a master-batch, at a loading of 2000 to 5000 ppm based on the total weight, prior to grafting, of the impact co-PP or the co-grafted polymers. The grafting monomer was maleic anhydride, which was melted and injected into the extruder as a liquid through an injection port; the amount of maleic anhydride injected into the extruder ranged from about 1.2 wt % to 2 wt %, again based on the total weight, prior to grafting, of the impact co-PP or the co-grafted polymers.

The barrel temperature profile was set from 190° C. to 220° C. for the reaction zone. After the grafting reaction, the unreacted reactive monomer was removed by vacuum extraction at a vent port. The product was cooled to 190° C. to 170° C. before being pelletized using a Scheer strand pelletizer available from Reduction Engineering GmbH of Korntal-Münchingen, Germany.

Examples PP-13, PP-14 and PP-15 were produced with solvent injection upstream of the vacuum extraction to improve volatile removal efficiency. In addition, Example PP-11 is a repetition of Example PP-10, using a different lot of the same impact co-PP.

The components of the grafted and co-grafted PP compositions, their melt flow rates, their maleic anhydride graft levels by weight and their G/M ratios are set forth in Table 1, in which "Comp" means "Comparative Example".

TABLE 1

| Example No. | Description | MFRM (measured) 190° C./325 g (g/10 min) | MFR (estimated) 230° C./2.16 kg (g/10 min) | G/M Ratio |
| --- | --- | --- | --- | --- |
| Comp PP-1 | random co-PP containing 5.5 wt % ethylene (melt point 135° C.) grafted with 1.4 wt % maleic anhydride | 54.1 | 1532 | 0.091 |
| Comp PP-2 | impact co-PP containing 12.5 wt % ethylene (melt point 166° C.) grafted with 1.27 wt % maleic anhydride | 4.5 | 153 | 0.830 |
| PP-3 | 63 wt % impact co-PP containing 12.5 wt % ethylene (melt point 166° C.) and 37 wt % random co-PP containing 5.5 wt % ethylene (melt point 135° C.) co-grafted with 1.29 wt % maleic anhydride | 14.1 | 420 | 0.307 |
| PP-4 | 58 wt % impact co-PP containing 12.5 wt % ethylene (melt point 166° C.) and 42 wt % random co-PP containing 5.5 wt % ethylene (melt point 135° C.) co-grafted with 1.29 wt % maleic anhydride | 19.5 | 570 | 0.226 |
| PP-5 | 68 wt % impact co-PP containing 10.8 wt % ethylene (melt point 141° C.) and 32 wt % random co-PP containing 5.5 wt % ethylene (melt point 135° C.) co-grafted with 1.28 wt % maleic anhydride | 19.1 | 560 | 0.229 |
| PP-6 | 68 wt % impact co-PP containing 10.8 wt % ethylene (melt point 141° C.) and 32 wt % random co-PP containing 5.5 wt % ethylene (melt point 135° C.) co-grafted with 1.42 wt % maleic anhydride | 19.9 | 580 | 0.245 |
| Comp PP-7 | impact co-PP containing 19.9 wt % ethylene (melt point 146° C.) grafted with 1.42 wt % maleic anhydride | 6.4 | 205 | 0.693 |
| PP-8 | 58 wt % impact co-PP containing 19.9 wt % ethylene (melt point 146° C.) and 42 wt % random co-PP containing 5.5 wt % ethylene (melt point 135° C.) co-grafted with 1.46 wt % maleic anhydride | 15.4 | 455 | 0.321 |
| PP-9 | 68 wt % impact coPP containing 19.9 wt % ethylene (melt point 146° C.) and 32 wt % random coPP containing 5.5 wt % ethylene (melt point 135° C.) co-grafted with 1.45 wt % maleic anhydride | 10.7 | 324 | 0.447 |
| PP-10 | impact co-PP containing 10.8 wt % ethylene (melt point 141° C.) grafted with 1.39 wt % maleic anhydride | 13.2 | 395 | 0.352 |
| PP-11 | impact co-PP containing 10.8 wt % ethylene (melt point 141° C.) grafted with 1.43 wt % maleic anhydride | 12.4 | 371 | 0.385 |
| Comp PP-12 | random co-PP containing 5.5 wt % ethylene (melt point 135° C.) grafted with 1.03 wt % maleic anhydride | 27.8 | 802 | 0.128 |
| PP-13 | 61 wt % impact coPP containing 12.5 wt % ethylene (melt point 166° C.) and 39 wt % random coPP containing 5.5 wt % ethylene (melt point 135° C.) co-grafted with 1.28 wt % maleic anhydride | 15.9 | 470 | 0.272 |
| PP-14 | impact coPP containing 12.5 wt % ethylene (melt point 166° C.) grafted with 1.27 wt % maleic anhydride | 8.2 | 256 | 0.496 |
| PP-15 | 57 wt % impact coPP containing 19.9 wt % ethylene (melt point 146° C.) and 43 wt % random coPP containing 5.5 wt % ethylene (melt point 135° C.) co-grafted with 1.31 wt % maleic anhydride | 10.3 | 314 | 0.417 |

Examples 16 to 31

PP*/EVOH/PP* Structures Obtained by Co-Injection Molding

Three-layer containers having the structure PP*/EVOH/PP* ("PP*" notation is as defined above) were fabricated by co-injection molding at Kortec, Inc., located at 428 Newburyport Turnpike, Rowley, Mass. 01969, USA.

The ungrafted PP resin was an impact co-PP with melt flow rate of 120 g/10 min, as measured by ASTM D1238 at 230° C. and 2.16 kg, and a flexural modulus of 1450 megaPascals, as measured by ASTM D790A. The functionalized polypropylenes were as described in Table 1. Several PP* blends were made, including from 2.5 to 10 wt % of functionalized polypropylene(s) and a complementary amount of ungrafted impact co-PP, so that the total amount of functionalized polypropylene(s) and ungrafted impact co-PP in each PP* blend was 100 wt %, based on the total weight of the PP* blend. The ethylene vinyl alcohol copolymer (EVOH) barrier resin included 32 mole % of copolymerized ethylene and had a melt flow rate of 12 g/10 min, measured at 210° C. and 2.16 kg according to ASTM D1238.

The three-layer containers were made on a Husky™ molding machine, available from Husky Injection Molding Systems, Inc., of Mokena, Ill. The ungrafted PP resin was dry-blended with the functionalized polypropylene(s) and processed through the main screw (40 mm, L/D ratio 25:1) at about 245° C. to form a melt blend. The secondary screw (18 mm, L/D ratio 21:1) processed the EVOH at about 235° C. The hot runner was a co-injection system in which the PP* blends and the EVOH were kept in separate manifolds until entering the nozzle shortly before being injected into the cavity. The manifold for the PP* blends was heated to 245° C. and the manifold for EVOH was heated to 235° C. The containers had a volume of 230 ml and a weight of 10 g. The nominal thickness of the containers' sidewalls was 0.6 mm, and the nominal gauge of the containers' middle EVOH layer was 50 microns.

The containers were conditioned at 70° F. and 50% relative humidity for at least 24 h; then, the adhesion of the layers was measured on one-inch strips taken from the sidewall of the container in the hoop direction. Each strip was partially separated at the outer PP*/EVOH interface. The separated tabs of the strip were placed in the clamps of a tensile tester (Model No. SN4465, available from Instron of Norwood, Mass.) and pulled apart in a T-peel test at a speed of 30.48 cm/min to measure the peel force. Tables 2 through 5 show the average peel force of five strips taken from five separate containers, reported in units of g/25 mm. The error bars are standard deviations.

Table 2 demonstrates that the adhesive strength of blends comprising Comparative PP-2, PP-3 and PP-4 is significantly superior to that of blends comprising Comparative PP-1. The difference in peeling force between blends including Comparatives PP-1 and PP-2 illustrates the importance of grafted impact co-PP in improving the adhesion of these compositions. Moreover, Examples PP-3 and PP-4, which include co-grafted co-PPs, exhibit adhesion performance that is at least similar if not superior to that of blends including Comparative PP-1 or Comparative PP-2, which do not include co-grafted co-PPs. Finally, these results also show that blends comprising the co-grafted co-PPs that have a G/M ratio less than 0.5 develop superior adhesion at lower levels of grafted co-PP, compared to blends comprising Comparative PP-2.

TABLE 3

| Example | Grafted PP in PP* blend (wt %) | Comp. PP-7 | PP-8 | Comparative PP-1 |
|---|---|---|---|---|
| 20 | 2.5 | | | 51 ± 40 |
| 21 | 5 | 551 ± 364 | 1027 ± 136 | 753 ± 417 |
| 22 | 7.5 | 918 ± 352 | | 764 ± 295 |
| 23 | 10 | 2680 ± 711 | 2842 ± 479 | 1059 ± 480 |
| MFR | | 205 | 455 | 1532 |
| g-level | | 1.42 | 1.46 | 1.4 |
| G/M | | 0.693 | 0.321 | 0.091 |

The data in Table 3 also demonstrate the importance of impact co-PP and co-grafted co-PPs that have a G/M ratio less than 0.5 to improving the adhesion of these compositions. In addition, Example PP-8, which includes co-grafted co-PPs, exhibits adhesion performance that is at least similar if not superior to that of blends including Comparative Example PP-7, which does not include co-grafted co-PPs. Moreover, the performance of Example PP-8 is significantly superior to that of Comparative Example PP-1, which does not include co-grafted co-PPs.

TABLE 4

| Example | wt % Grafted PP in PP* blend | PP-5 | PP-6 | Comparative PP-1 |
|---|---|---|---|---|
| 24 | 2.5 | 109 ± 15 | 386 ± 400 | 298 ± 101 |
| 25 | 5 | 3189 ± 1015 | 2596 ± 111 | 788 ± 125 |
| 26 | 7.5 | 3495 ± 611 | 3912 ± 649 | 1332 ± 267 |
| 27 | 10 | 5135 ± 469 | 5039 ± 1507 | 1246 ± 440 |
| MFR | | 560 | 580 | 1532 |

TABLE 2

| Example | wt % grafted PP in PP* blend | Comp. PP-2 | PP-3 | PP-4 | Comp. PP-1 |
|---|---|---|---|---|---|
| 16 | 2.5 | 181 ± 41 | | 786 ± 363 | 51 ± 40 |
| 17 | 5 | | 2349 ± 454 | 1993 ± 267 | 753 ± 417 |
| 18 | 7.5 | 2438 ± 319 | | 3559 ± 296 | 764 ± 295 |
| 19 | 10 | 2290 ± 613 | 3301 ± 291 | 3601 ± 229 | 1059 ± 480 |
| MFR | | 153 | 420 | 570 | 1532 |
| g-level | | 1.27 | 1.29 | 1.29 | 1.4 |
| G/M Ratio | | 0.830 | 0.307 | 0.226 | 0.091 |

TABLE 4-continued

| Example | wt % Grafted PP in PP* blend | PP-5 | PP-6 | Comparative PP-1 |
|---|---|---|---|---|
| g-level | | 1.28 | 1.42 | 1.4 |
| G/M | | 0.229 | 0.245 | 0.091 |

The data in Table 4 demonstrate that excellent adhesion can be obtained with co-grafted blends such as Examples PP-5 and PP-6, despite a lower level of functionalization, provided that the G/M ratios of the co-grafted blends are held roughly constant.

TABLE 5

| Example | wt % Grafted PP in PP* blend | Comp. PP-2 (from trial of Table 2) | PP-14 | PP-13 | PP-15 | Comparative PP-1 |
|---|---|---|---|---|---|---|
| 28 | 2.5 | 181 ± 41 | 223 ± 203 | 36 ± 4 | 74 ± 24 | 36 ± 4 |
| 29 | 5 | | 429 ± 401 | 1821 ± 861 | 1699 ± 1184 | 276 ± 198 |
| 30 | 7.5 | 2438 ± 319 | 3238 ± 1604 | 4875 ± 859 | 3636 ± 1955 | 1029 ± 307 |
| 31 | 10 | 2290 ± 613 | 4729 ± 2617 | 3718 ± 2653 | 3005 ± 2585 | 1378 ± 382 |
| MFR | | 153 | 256 | 470 | 314 | 1532 |
| g-level | | 1.27 | 1.27 | 1.28 | 1.31 | 1.40 |
| G/M Ratio | | 0.830 | 0.496 | 0.272 | 0.417 | 0.091 |

Similarly to the results in Table 2, the data in Table 5 demonstrate that the grafted impact co-PP provides superior adhesion, compared to grafted random co-PP. In particular, the juxtaposition of Example PP-14 and Comparative Example PP-2 reveals that a grafted impact co-PP having a G/M ratio less than 0.5 also affords improved bond strength. In addition, the data show that blends comprising the co-grafted co-PPs develop superior adhesion at lower levels of grafted co-PP compared to the adhesion of a single grafted impact co-PP.

Examples 32 to 35

PP/Tie/EVOH Structures Obtained by Blown Film Extrusion

Polypropylene adhesives were coextruded as tie layers between a layer of homo-PP (melt flow rate 3.5 g/10 min (230° C., 2.16 kg); density 0.9 g/cm³) and a layer of ethylene vinyl alcohol copolymer (Eval® F171A, available from Kuraray America, Inc., of Houston, Tex.). The adhesives were melted at about 225° C. in a 1.25 inch extruder operated at about 27 rpm. The homo-PP was melted at about 227° C. in a 1.25 inch extruder operated at about 45 rpm, and the EVOH was melted at about 227° C. in a 1.25 inch extruder operating at about 34 rpm. The melt streams were fed through a coextrusion die (available from Brampton Engineering, Inc., of Brampton, Ontario) to form a three-layer film. The rate of film formation was about 9 m/min, and the nominal thickness of each layer was PP(50 microns)/tie(13 microns)/EVOH(23 microns).

The adhesion strength of the multilayer films was measured on one-inch strips cut in the machine direction. Each strip was partially separated at the tie interface. The separated tabs of the strips were placed in the clamps of a tensile tester (Instron Model No. SN4465) and pulled apart in a T-peel test at a speed of 12 inches/min to measure the peel force. Table 6 shows the average peel force of five strips, reported in units of g/25 mm. The error bars are standard deviations.

TABLE 6

| Example | wt % Grafted PP in PP* blend | PP-11 | PP-10 | PP-3 | Comp. PP-2 | Comp. PP-1 | Comp. PP-12 |
|---|---|---|---|---|---|---|---|
| 32 | 5 | | 553 ± 169 | 576 ± 185 | 172 ± 115 | 250 ± 91 | 250 ± 91 |
| 33 | 7.5 | 723 ± 164 | 1010 ± 186 | 1044 ± 89 | 1365 ± 82 | 641 ± 264 | 607 ± 134 |
| 34 | 10 | 1119 ± 326 | 1247 ± 192 | 1174 ± 89 | 982 ± 115 | 647 ± 218 | 829 ± 246 |
| 35 | 20 | | 1126 ± 142 | 1007 ± 137 | 1145 ± 83 | 381 ± 49 | 811 ± 139 |
| MFR | | 371 | 395 | 420 | 153 | 1532 | 802 |
| g-level | | 1.43 | 1.39 | 1.29 | 1.27 | 1.4 | 1.03 |
| G/M Ratio | | 0.385 | 0.352 | 0.307 | 0.83 | 0.091 | 0.128 |

The data in Table 6 demonstrate that adhesive compositions including grafted impact co-PPs and co-grafted co-PP blends also exhibit improved performance when used as tie layers in blown films. In particular, films including blends of PP-3, PP10 and PP-11 have a peel force that is superior to the peel force of films including blends of grafted random co-PP, such as Comparatives PP-1 and PP-12. Example PP-3, which includes a significant amount of co-grafted random co-PP, has adhesion similar to that of Comparative Example PP-2.

Notably, the results in Table 6 show that grafted impact co-PPs and co-grafted co-PP blends having relatively high melt flow rates are processible on blown film equipment. Moreover, Examples PP-3, PP-10 and PP-11 provide tie layers having superior adhesion strength that matches favorably with the higher molecular weight material of Comparative Example PP-2. In contrast, the results obtained from films including tie layers of grafted random co-PP, such as Comparative Examples PP-1 and PP-12 indicate that there is an upper limit beyond which further increasing the melt flow rate detracts from adhesion strength.

Example 36: Extrusion Lamination Process

A biaxially oriented polyester substrate (BOPET, 23 micron thickness, 550 mm width) is first subjected to corona treatment at 4.5 kW over its entire width at a watt density of about 103 W/(m$^2$-min). A polyethylene imine primer, Mica A-131-X available from the Mica Corporation of Shelton, Conn., is then applied to the corona-treated side of the BOPET film by gravure, using a 300QCH chrome gravure cylinder and a 60 Shore-A rubber back-up roll at a line speed of about 80 m/min. The coated primer solution is dried on-line using a 4-meter air-flotation dryer with zones set at 110° C. to yield a primer coating of 0.35 dry grams per square meter.

The primed and dried BOPET film is coated by extrusion on an extrusion coating line at a line speed of about 80 m/min with three co-extruded layers (homoPP*/nylon 6/random co-PP*), of which the random co-PP layer is extruded directly onto the primed surface. The HomoPP (MFR 22 g/10 min (230 C, 2.16 kg), density 0.90 g/cc) is dry blended with 20 wt % of adhesive PP-6 (see above) and extruded on a 90 mm extruder with barrel settings at 200/230/260/290/315° C. The nylon 6 (Aegis H85NP, available from Honeywell Resins and Chemicals of Morristown, N.J.) is extruded on a 63.5 mm extruder with barrel settings at 180/210/240/270/300° C. The co-PP is a random co-PP (MFR 7 g/10 min (230 C, 2.16 kg), density 0.90 g/cc, melt point 134° C.) which is dry-blended with 20 wt % of adhesive PP-6. The feedblock temperature is set at 300° C. and the coextrusion die temperature is 315° C. The air gap between the die and the chill roll is about 10 mm. The thicknesses of the coextruded layers are 25 microns for the homoPP* blend layer, 10 microns for the Nylon 6 layer, and 5 microns for the random co-PP* blend layer. One inch strips of the laminate are cut for testing the adhesion between the co-PP blend and the primed surface at room temperature or after soaking in water at room temperature for one week. It is expected that the difficulty of initiating a separation under these two sets of conditions will be indicative of superior adhesion.

While certain of the preferred embodiments of this invention have been described and specifically exemplified above, it is not intended that the invention be limited to such embodiments. Various modifications may be made without departing from the scope and spirit of the invention, as set forth in the following claims.

The invention claimed is:

1. A polypropylene composition comprising an anhydride-grafted impact co-PP, wherein the weight percentage of grafted anhydride monomer (G) in the anhydride-grafted impact co-PP and the melt flow rate (M) of the anhydride-grafted impact co-PP are related by the equation $(G/M)*100<0.5$; wherein the melt flow rate at 230° C. under a 2.16 kg load is measured or calculated; wherein the weight percentage is based on the total weight of the anhydride-grafted impact co-PP, and wherein the anhydride-grafted impact co-PP is blended with at least one grafted random co-PP, at least one additional grafted impact co-PP, at least one grafted homopolypropylene, or a combination of two or more thereof.

2. The polypropylene composition of claim 1, wherein the weight percentage of grafted anhydride monomer (G) in the anhydride-grafted impact co-PP and the melt flow rate (M) of the anhydride-grafted impact co-PP are related by the equations $0.2<(G/M)*100<0.5$.

3. The polypropylene composition of claim 1, wherein the at least one impact co-PP comprises about 10 wt % or more of copolymerized units of ethylene, based on the total weight of the impact co-PP prior to grafting.

4. The polypropylene composition of claim 1, having a melt flow rate between 4.0 and 32 g/10 min, measured according to ASTM D-1238 at 190° C. under a 325 g load.

5. The polypropylene composition of claim 1, wherein the grafted composition comprises from 0.5 wt % to 4 wt % of grafted anhydride units, based on the total weight of the anhydride-grafted impact co-PP.

6. The polypropylene composition of claim 1, wherein the anhydride is maleic anhydride.

7. The polypropylene composition of claim 1, blended with at least one ungrafted polypropylene selected from the group consisting of random co-PP, impact co-PP, and homopolypropylene; and optionally further blended with one or more elastomeric polymers selected from the group consisting of hydrocarbon elastomers, styrene copolymers, ethylene alphaolefin copolymers, and propylene alpha-olefin copolymers.

8. The polypropylene composition of claim 7, wherein the hydrocarbon elastomer(s) are selected from the group consisting of ethylene propylene rubber, ethylene propylene diene rubber, styrene-butadiene thermoplastic rubber, styrene-isoprene thermoplastic rubber, butyl rubber, and polyisobutylene.

9. The polypropylene composition of claim 7, comprising about 65 wt % to about 95 wt % of the at least one ungrafted polymer, or the combination of two or more ungrafted copolymers, and optionally comprising up to 30 wt % of the one or more elastomeric polymers, based on the total weight of the polypropylene composition.

10. The polypropylene composition of claim 1, wherein the at least one additional grafted random co-PP, the at least one additional grafted impact co-PP, or the at least one grafted homopolypropylene is grafted with maleic anhydride.

11. The polypropylene composition of claim 9, wherein the polypropylene composition comprises about 5 wt % to about 35 wt % of the at least one grafted polypropylene, or the combination of two or more grafted polypropylenes, based on the total weight of the polypropylene composition.

12. A dry blend or a melt blend comprising the polypropylene composition of claim 1.

13. A multilayer structure comprising at least one layer, a second layer, and optionally a third layer, said at least one layer comprising the polypropylene composition of claim 1.

14. The multilayer structure of claim 13, comprising the substructure "PP*/B" or "PP tie/B", wherein the symbol "I" denotes adjacent layers, the symbol "B" denotes a barrier structure comprising at least one layer comprising a barrier resin, the symbol "PP*" denotes a bulk layer comprising the polypropylene composition, and the symbol "PP tie" denotes an adhesive layer comprising the polypropylene composition; and optionally comprising a substructure selected from the group consisting of "PP tie/B/PP tie", "PP tie/B/tie", "PP*/B/PP*", "PP*/B/PE*", and "PP tie/B/PE tie", wherein the symbol "tie" denotes an adhesive layer that does not comprise a grafted impact co-PP or a co-grafted impact co-PP; wherein the symbol "PE*" denotes a bulk layer comprising an ethylene polymer selected from the group consisting of polyethylene and an ethylene copolymer, and an anhydride-grafted polymer selected from the group consisting of an anhydride-grafted polyethylene and an anhydride-grafted polyethylene copolymer; wherein the symbol "PE tie" denotes an adhesive layer comprising polyethylene and an anhydride-grafted polymer selected from the group consisting of an anhydride-grafted polyethylene and an anhydride-grafted polyethylene copolymer; wherein the two PP* layers in the substructure "PP*/B/PP*" are the same or different; and wherein the two PP tie layers in the substructure "PP tie/B/PP tie" are the same or different.

15. The multilayer structure of claim 13, wherein the barrier resin comprises EVOH, a polyamide, or a combination of EVOH and a polyamide, wherein the symbol "EVOH" denotes a layer comprising a copolymer of ethylene and vinyl alcohol.

16. The multilayer structure of claim 15, wherein the barrier structure comprises the substructure "PA/EVOH/PA", and wherein the symbol "PA" denotes a layer comprising a polyamide.

17. The multilayer structure of claim 13, wherein the at least one layer is adhered to the second layer, and wherein the second layer is selected from the group consisting of oriented films; metal foils; and woven or non-woven fabrics, nettings and scrims; and optionally wherein the second layer is coated with a chemical primer.

18. An article comprising the polypropylene composition of claim 1, said article produced by a process selected from the group consisting of a blown film process, a cast film process, a cast sheet process, a co-extrusion coating process, a co-extrusion lamination process, and a co-injection molding process.

19. The article of claim 18, wherein the co-injection molding process is a co-injection stretch blow molding process.

* * * * *